United States Patent
Ruck et al.

(10) Patent No.: US 10,641,602 B2
(45) Date of Patent: May 5, 2020

(54) PROBE SYSTEM FOR MEASURING AT LEAST ONE MEASUREMENT OBJECT IN OPTICAL AND TACTILE FASHION

(71) Applicant: Carl Zeiss Industrielle Messtechnik GmbH, Oberkochen (DE)

(72) Inventors: Otto Ruck, Ellwangen (DE); David Hoecherl, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 34 days.

(21) Appl. No.: 16/157,761

(22) Filed: Oct. 11, 2018

(65) Prior Publication Data
US 2019/0107383 A1 Apr. 11, 2019

(30) Foreign Application Priority Data
Oct. 11, 2017 (DE) .................... 10 2017 218 085

(51) Int. Cl.
| | | |
|---|---|---|
| *G01B 11/00* | (2006.01) | |
| *G01B 9/04* | (2006.01) | |
| *G01B 7/012* | (2006.01) | |
| *G02B 21/36* | (2006.01) | |

(52) U.S. Cl.
CPC ............ *G01B 11/007* (2013.01); *G01B 7/012* (2013.01); *G01B 9/04* (2013.01); *G02B 21/361* (2013.01)

(58) Field of Classification Search
CPC ........ G01B 11/007; G01B 7/012; G01B 9/04; G02B 21/361
See application file for complete search history.

(56) References Cited

U.S. PATENT DOCUMENTS

| 5,118,956 A | 6/1992 | Dunning et al. | |
|---|---|---|---|
| 2014/0043468 A1* | 2/2014 | Engel ................. | G01B 11/14 348/135 |

FOREIGN PATENT DOCUMENTS

| DE | 10111130 A1 | 9/2002 |
|---|---|---|
| DE | 10258283 A1 | 7/2004 |

* cited by examiner

*Primary Examiner* — Jamil Ahmed
(74) *Attorney, Agent, or Firm* — Falk Ewers; Ewers IP Law PLLC

(57) ABSTRACT

A probe system for measuring a measurement object in optical and tactile fashion is provided which includes a tactile sensor. The tactile sensor includes a tactile probe element. The tactile probe element has a sensor surface and is configured to probe the measurement object in a tactile fashion at at least one probing point on the sensor surface. The probe system further includes a microscope camera which includes an illumination device configured to produce an illumination light beam. The microscope camera further includes a microscope optical unit configured to focus the illumination light beam in the probing point and to produce a magnified image of the measurement object in an image plane. The microscope camera also includes an image capture device configured to record the magnified image and is at least partly arranged in the tactile probe element.

18 Claims, 2 Drawing Sheets

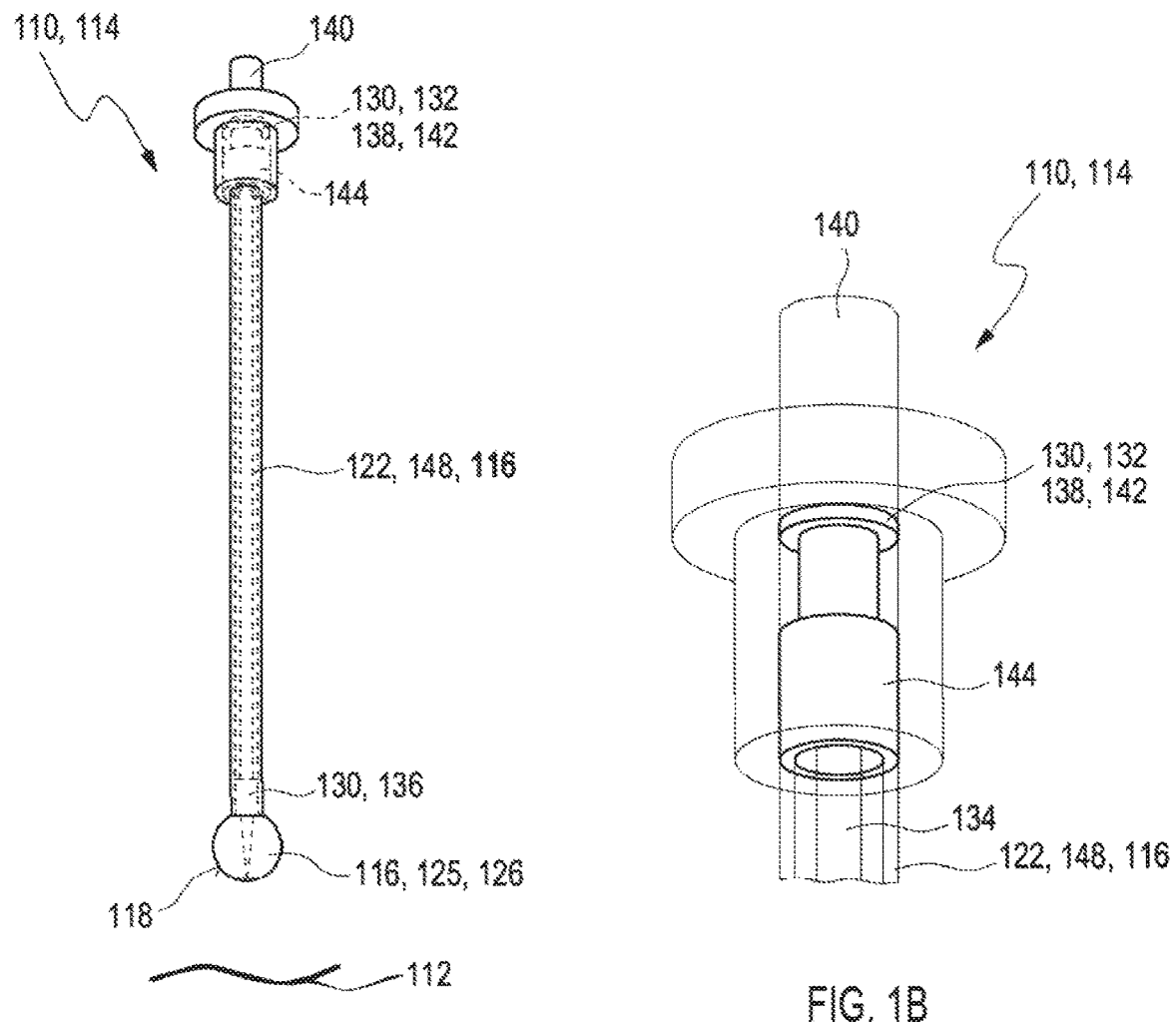
FIG. 1A
FIG. 1B
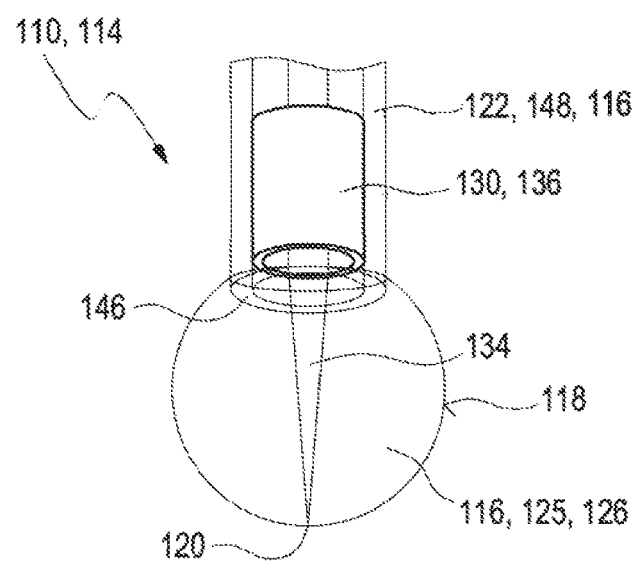
FIG. 1C

PROBE SYSTEM FOR MEASURING AT LEAST ONE MEASUREMENT OBJECT IN OPTICAL AND TACTILE FASHION

CROSS REFERENCE TO RELATED APPLICATIONS

This application claims priority to German patent application DE 10 2017 218 085.4, filed Oct. 11, 2017, the entire content of which is incorporated herein by reference.

TECHNICAL FIELD

The invention relates to a probe system and a coordinate measuring machine for measuring at least one measurement object in optical and tactile fashion. Further, the invention relates to a method for measuring at least one measurement object in optical and tactile fashion using a coordinate measuring machine. The present invention relates in particular to the field of coordinate measuring technology using a tactile coordinate measuring machine.

BACKGROUND

Various devices and methods for measuring measurement objects are known from the prior art. Coordinate measuring machines have tactile sensors which probe a surface of the measurement object, for example mechanically. Tactile sensors of this type typically have a probing element in the form of a probe ball that is secured to a transmission element. During probing by the probe ball with the measurement object, forces that arise on the probe ball are measured in three axes and a direction vector of the probing, the so-called probing vector, is determined therefrom and the measurement object is thus measured.

Devices having optical sensors, in particular coordinate measuring machines having an optical measuring head or measurement microscopes, are furthermore known. Devices of this type are configured to measure the measurement object in a non-contact manner. By way of example, DE 101 11 130 A1 describes a coordinate measuring machine including a video probe head that is displaceable in the coordinate directions (x, y, z) by way of a mechanism and a control and evaluation unit for processing the measurement values and for controlling the mechanism. The advance data are derived from the image data of the video probe head in order to be able to displace the video probe head in automated fashion along the contour of a workpiece with an unknown workpiece contour.

Features of the measurement object can be measured using coordinate measuring machines including measuring probe heads. In optically expanded coordinate measuring machines, further features that are not measurable in tactile fashion, for example because these cannot be probed mechanically, can be measured by a camera. Examples of these features are prints on a workpiece, soft materials or transitions of composite materials, which can only be distinguished optically. However, other measurement objects cannot be measured optically as they are only accessible with a stylus, such as deep bores, for example. Moreover, capturing a Z-component (height) with a sufficient accuracy may not be possible in the case of an optical measurement as the Z-component can only be established approximately by way of focusing.

SUMMARY

It is therefore an object of the present invention to provide a probe system and a coordinate measuring machine for measuring at least one measurement object in optical and tactile fashion, which at least largely avoid the disadvantages of known devices and methods. In particular, the flexibility of previous coordinate measuring machines should be increased and a number of possible, measurable workpieces should be enlarged and substantial disadvantages of optical measurement technology, such as focusing the camera image and exactly determining the Z-component, for example, should be avoided.

This object is achieved by a probe system and a coordinate measuring machine for measuring at least one measurement object in optical and tactile fashion as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person skilled in the art, can also be carried out using other configurations. Similarly, features introduced by "in one embodiment of the invention" or by "in one exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

According to a first aspect of the present invention, a probe system for measuring at least one measurement object in optical and tactile fashion is provided. In the context of the present invention, a "probe system" can be understood to mean a device having, in principle, any shape, which is configured to probe a measurement object with at least one touch and/or in a non-contact manner. A "system" can be understood to mean a device which includes at least two elements, e.g., components. In this case, a measurement object can generally be understood in the context of the present invention to mean an object to be measured that has any shape. By way of example, the measurement object can be selected from the group consisting of a test specimen, a workpiece to be measured, and a component to be measured. The measurement object, in particular the surface of the measurement object, can have great curvatures, i.e., small radii through to sharp edges. The measurement object can include a chip, in particular a microchip, having conductor track structures. Other measurement objects are also conceivable, however.

The probe system includes:
- at least one tactile sensor, wherein the tactile sensor has at least one tactile probe element, wherein the tactile probe element has a sensor surface, wherein the tactile probe element is configured to probe the measurement object in tactile fashion at at least one probing point on the sensor surface; and
- at least one microscope camera, wherein the microscope camera has at least one illumination device which is configured to produce an illumination light beam, wherein the microscope camera has at least one microscope optical unit which is configured to focus the illumination light beam in the probing point and produce at least one magnified image of the measurement object in at least one image plane, wherein the microscope camera has at least one image capture device which is configured to record the magnified image.

The microscope camera is at least partly arranged in the tactile probe element.

In the context of the present invention, a tactile sensor can be understood to mean a sensor configured to interact with the surface of the measurement object, for example mechanically, and to produce an information item about a probing point. The tactile sensor can be configured as a probe. The tactile sensor has the at least one tactile probe element. The tactile sensor can have a shaft for fastening the tactile probe element. The tactile sensor can have an adapter configured to connect the tactile sensor to a further device, for example a coordinate measuring machine. By way of example, the tactile sensor can be an inductively or capacitively measuring tactile sensor.

In the context of the present invention, a "tactile probe element" can be understood to mean an element of the tactile sensor configured to interact with the surface of the measurement object. In particular, the tactile probe element can probe the measurement object at the at least one probing point. In the context of the present invention a "probing point" can be understood to mean a point, a location or an area on a sensor surface which is at the smallest distance between the measurement object and the surface of the tactile probe element. In particular, the probing point can be a point of contact between the surface of the tactile probe element and the surface of the measurement object.

The tactile probe element can have at least one probing element. The probing element can have at least one probe ball. However, other forms are also conceivable. "Tactile probing" and "tactile sensing" can be understood to mean an interaction of the tactile sensor with the measurement object. By way of example, the tactile probe element can touch the surface of the measurement object, for example by the surface of the measurement object being brought into contact with a surface of the tactile probe element, and/or the tactile probe element can interact with the surface of the measurement object in a non-contact manner, for example capacitively. During the interaction, the surface of the tactile probe element and the surface of the measurement object can touch one another. In particular, the surface of the tactile probe element and the surface of the measurement object can make electrical contact with one another. Alternatively, the interaction can be non-contact, for example inductive or capacitive. The coordinate system of the probing element can be for example a Cartesian coordinate system or a spherical coordinate system. Other coordinate systems are also conceivable. An origin or zero point of the coordinate system can be at a center, for example a midpoint of the ball in the case of a probe ball as probing element. By way of example, the probing point can be a point in the coordinate system of the probe system arranged on the surface of the probe system.

The tactile sensor may be configured to produce at least one signal, for example an electronic signal. In the context of the present invention, a signal can be understood to mean an arbitrary signal which is produced by the tactile sensor owing to the interaction with the measurement object and/or which is produced in reaction to the interaction with the measurement object. The signal can be evaluated by at least one control and evaluation unit and at least one information item about a measurement point at the surface of the measurement object can be produced from the signal.

A "microscope camera" can be understood to mean a device configured to produce the at least one magnified image of the measurement object in at least one image plane and to record the magnified image. To this end, the microscope camera has the at least one micro-scope optical unit and the at least one image capture device.

"A microscope optical unit" can be understood to mean an optical system comprising at least one optical component with magnifying properties. The microscope optical unit can have a plurality of optical components. In this case, the components can be configured in a manner spatially separated from one another. By way of example, the microscope optical unit can include a plurality of optical components, for example one or more objectives, stops and/or further optical components.

The microscope optical unit can have at least one optical element. The optical element can be selected from the group consisting of: a plurality of lenses, for example gradient index lenses (GRIN); at least one lens system, at least one mirror; at least one mirror system. By way of example, the optical element can have at least one lens system with at least one germanium alloy, as result of which optical probing at heat transfers becomes possible. By way of example, the optical element can include a combination of lenses and mirror systems. The microscope optical unit can have a magnification from 2× to 5000×, preferably from 10× to 1000×. The microscope optical unit can have an optical axis, for example a common optical axis of the optical elements.

A "magnified image" can be understood to be an image of the measurement object and/or of part of the measurement object which is magnified in an object plane in comparison with the size of the measurement object and/or of the image part of the measurement object. The microscope optical unit can transmit some of the energy emanating from the measurement object in the visible spectral range into the at least one image plane. By way of example, the energy can be produced by illuminating the measurement object and can be converted at the measurement object into transferable energy, for example by reflection. An "image plane" can be understood to mean a plane perpendicular to the optical axis, in which at least one image point of the produced image lies.

An "image capture device" can be understood to mean a device configured to receive and/or record and/or process further an image. The image capture device can have a plurality of pixels. The image capture device can have at least one charge-coupled device (CCD), and/or at least one complementary metal-oxide-semiconductor (CMOS) camera. By way of example, the image capture device can have at least one CCD chip, for example with a resolution of 1280×720 pixels.

The microscope camera can be connectable to at least one further device, for example to a control and evaluation unit. To this end, the microscope camera can have at least one interface. In particular, the microscope camera can have at least one interface. The microscope camera can have a universal interface, for example at least one Universal Serial Bus (USB) interface, for example a USB 1.0, USB 2.0, USB 3.0 or USB 3.1 interface. The USB interface can have a type A, a type B or a type C plug-in connector, for example. As an alternative or in addition thereto, the microscope camera can have at least one radio interface. By way of example, the microscope camera can have at least one USB camera. A "USB camera" can be understood to mean a camera having at least one USB interface. The use of a USB camera can be advantageous as it has an interface with very few lines, it can be produced cost-effectively and it can easily be integrated into the measurement machines/sensor systems at interchange interfaces. In principle, cameras with differently configured interfaces are also conceivable, for example LAN cameras with synchronous sensing of the images in relation to the machine position.

An "illumination device" can be understood to mean a device configured to produce an illumination light beam. In the context of the present invention, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 μm, wherein the range of 780 nm to 1.4 μm is designated as near infrared (NIR), and the range of 15 μm to 1000 μm is designated as far infrared (FIR). The term ultraviolet encompasses, in principle, a spectral range of 100 nm to 380 nm. Visible light, that is to say light from the visible spectral range, is typically used in the context of the present invention. The term "light beam" can be understood to mean, in principle, a quantity of light which is emitted and/or radiated in a specific direction. The light beam can be a beam of rays. The illumination device can have at least one light source. By way of example, the illumination device can have a plurality of identical or differently configured light sources. By way of example, the illumination device can have at least one light-emitting diode (LED). The illumination device can have a plurality of LEDs, for example 2, 3, 6 or more LEDs. At least one property of the illumination light beam can be adjustable. By way of example, the illumination device can be configured to dim the illumination light beam.

As explained above, the microscope optical unit is configured to focus the illumination light beam in the probing point. In particular, the illumination light beam can be focused in a point or region on the sensor surface of the tactile sensor. The microscope optical unit can be arranged in the tactile probe element in such a way that a focal spot of the microscope optical unit lies on the sensor surface.

The microscope camera is at least partly arranged in the tactile probe element. "At least partly arranged in the tactile probe element" can be understood to mean that at least parts of the microscope optical unit and/or at least parts of the image capture device and/or at least parts of the illumination device are arranged in the tactile probe element. By way of example, the microscope optical unit can be arranged in a shaft of the tactile probe element. The image capture device and/or the illumination device can be arranged at least partly outside of the tactile probe element, for example, e.g., in a further component of the tactile sensor and/or in a suspension, in particular a stylus receptacle, of a coordinate machine for the tactile probe element. The suspension may include an adapter plate. The tactile sensor has at least one tactile probe element. The tactile probe element may have the at least one shaft and the at least one probing element, e.g., a probe ball, as will be described in more detail below. The microscope optical unit may, for example, be arranged in the shaft of the tactile probe element, such that the microscope camera is at least partly arranged in the tactile probe element.

The tactile probe element can have at least one probing element. The probing element can have at least one probe ball. However, other forms are also conceivable.

In one exemplary embodiment, the probe ball is configured as a hemisphere which has a mirrored plane face. By way of example, the probe ball can be divided at any angle and the plane face can be mirrored. Such a configuration facilitates the ability to measure even within bores. The plane face can be configured to deflect the illumination light beam by the mirroring. By way of example, the probe ball can be divided centrally at an angle of 45° and the arising plane face can be mirrored such that there is a deflection through an angle of 90°. However, other divisions at other angles and, consequently, other deflection angles are also conceivable.

In an exemplary embodiment, the probe ball can be made of the two divided probe ball halves, described in the preceding paragraph, to form a full ball. The two probe ball halves can be calibrated separately. In general, the probe ball can be configured as a full ball, wherein the full ball is monolithic or composed from at least two parts.

The probing element can be composed of an at least partly transparent material. The probing element can have transmissive properties. The tactile probe element can be at least partly transparent to the illumination light beam and/or a light beam produced by the measurement object. The probing element can include $Al_2O_3$, for example 99.99% $Al_2O_3$. The probing element can have a dye, for example a red dye ($CrO_3$). The probing element can have an industrial ruby ball. The probing element can have an industrial sapphire ball, which has no dye.

The tactile probe element can have at least one shaft, on which the probing element is arranged. A "shaft" can be understood to mean a securing element with, in principle, any configuration, on which the probing element is arranged. The shaft can be a cylindrical shaft. The shaft can be configured as a tube; in particular, the shaft can be hollow. The shaft can have a length of less than 50 mm. A shaft length can be in the range of 20 to 240 mm. This range can also be undershot and/or exceeded for specific measurement tasks. The shaft can extend substantially perpendicularly to a support on which the measurement object is arranged, deviations from a perpendicular alignment being possible within the scope of component tolerances.

The probing element can be rotatable; in particular, the shaft and/or the probing element can be mounted rotatably about a rotation axis. In one exemplary embodiment, the probing element is configured as a hemisphere which has a mirrored plane face. In combination with a rotatable mount, optically identifiable features in bores can be identifiable at otherwise poorly accessible points and can be measured exactly.

As explained above, the microscope camera is at least partly arranged in the tactile probe element. "At least partly arranged in the tactile probe element" can be understood to mean that the microscope camera is completely arranged in the tactile probe element or that at least one component of the microscope camera is arranged outside of the tactile probe element. The microscope camera can be at least partly integrated in the tactile probe element. By way of example, the microscope camera can be at least partly arranged in the shaft. By way of example, the microscope optical unit can be at least partly arranged in the shaft and/or the image capture device can be at least partly arranged in the shaft.

The microscope optical unit can have at least one GRIN lens, in particular a GRIN rod lens and/or a system of GRIN lenses. In particular, the tactile probe element can be configured as a thin stylus in this exemplary embodiment. Such a configuration allows the integration of the mechanical shaft and the optical unit in a component The face of the probing element is directed towards the microscope camera, in particular the probe ball can be at least partly made plane such that no lens effect arises in a transition from shaft to probing element. The probing element and a fastening position of the probing element can be such that a focal plane of the microscope optical unit arises at the sensor surface such that the image produced by the image capture device is automatically in focus as soon as the measurement object is probed by the tactile sensor. Tactile probing can be combined with the optical probing such that, in addition to the accurate optical measurement, for example of XY, it is also possible to evaluate the normally impossible probing in Z, which is highly precise as a result of the tactile method. A curvature of the sensor surface of the probe ball can be neglected since an image field of the microscope camera can be small and very much smaller "field of view" of the small image field can be evaluated exactly in the center.

The probe system can have a reflected light illumination device. A "reflected light illumination device" can be understood to be an illumination device configured to produce at least one light spot on the surface of the measurement object. The reflected light illumination device can be part of the illumination device. The reflected light illumination device can be configured to illuminate the measurement object through the probing element. As a result, a reduction in the size of the probing element may be possible in the case of appropriate shaping of the microscope camera. A combination of an optical and tactile measurement in a manual mode can be particularly advantageous since no focusing aids and no overview camera, either, are necessary. The tactile probe element itself can at least approximately indicate a probing position. Measuring and/or imaging the measurement object can easily be effected by the optical measurement since the image of the microscope camera is already in focus and magnified.

The illumination device and/or the reflected light illumination device and/or the image capture device can be arranged in the stylus receptacle. Such a configuration allows a reduction in the size of the tactile probe element. The tactile sensor can have at least one light guide. The shaft may be produced from a transparent ceramic, for example glass, and may be configured to guide the illumination light beam to the probing element. The shaft can act as a light guide. The shaft may have a tube that is mirrored on the inside. This can prevent bothersome radiation being incident on the image capture device arranged in the stylus receptacle. Further, such a configuration can be advantageous since heat arising as a result of the illumination device arises at a non-critical point and not in the vicinity of the probing element.

The probe system can have at least one optical funnel. The optical funnel can be configured to guide the illumination light beam to the probing element. The optical funnel can have a greater opening width on a side of the optical funnel facing the illumination device than on a side of the optical funnel facing the probe ball. This may render a reduction in the probing element size possible.

According to a further aspect of the invention, a coordinate measuring machine for measuring at least one measurement object in optical and tactile fashion is provided. The coordinate measuring machine includes:

at least one probe system according to the invention, and
at least one control and evaluation unit which is configured to control the probe system and to produce at least one information item about a measurement point at the surface of the measurement object.

In regard to exemplary embodiments of the probe system, reference is made to the description of the probe system. For details and definitions with regard to the coordinate measuring machine, reference is made to the description of the probe system.

The coordinate measuring machine can be selected from a portal-type, gantry-type or horizontal-arm-type coordinate measuring machine. The coordinate measuring machine can include a measurement table for bearing the measurement object. The coordinate measuring machine can have at least one portal which has at least one first vertical column, at least one second vertical column and a cross beam which connects the first vertical column and the second vertical column. At least one vertical column selected from the first and second vertical columns can be movable in a horizontal direction on the measurement table. The coordinate measuring machine can have a coordinate system, for example a Cartesian coordinate system or a spherical coordinate system. Other coordinate systems are also conceivable. An origin or zero point of the coordinate system can be defined for example by a sensor of the coordinate measuring machine.

In general, "a control and evaluation unit" is understood to mean an electronic device configured to evaluate signals produced by the probe system. By way of example, for this purpose provision can be made of one or more electronic connections between the probe system and the control and evaluation unit. The control and evaluation unit can include, for example, at least one data processing device, for example at least one computer or micro-controller. The data processing device can have one or more volatile and/or non-volatile data memories, wherein the data processing device can be configured for example in terms of programming to actuate the probe system. The control and evaluation unit can include at least one evaluation computer, onto which measurement data, for example an image of the measurement object, can be transmitted and on which said measurement data can be evaluated.

The control and evaluation unit can furthermore include at least one interface, for example an electronic interface, in particular at least one USB interface, and/or a human-machine interface such as, for example, an input/output device such as a display and/or a keyboard. The USB interface can be USB 2.0 or USB 3.0. The control and evaluation unit can be constructed for example centrally or else in a decentralized manner. Other configurations are also conceivable.

The probe system can be connected to the coordinate measuring machine by, e.g., a connecting element, e.g., with an adapter. The probe system can be configured to be removable from, and interchangeable in, the coordinate measuring machine. The coordinate measuring machine can be a multi-sensor measuring machine which, in addition to the probe system, has further sensors.

An item of information regarding the measurement point may basically be understood to mean any item of information regarding the measurement point, for example a position and/or coordinates of the measurement point in the coordinate system of the probe system, in particular spherical coordinates in the probing ball coordinate system.

According to a further aspect of the invention, a method for measuring at least one measurement object in optical and tactile fashion is provided. A coordinate measuring machine according to an aspect of the invention is used in the method. The method includes the following steps:

a) tactile probing of the measurement object at at least one probing point on at least one sensor surface with at least one tactile probe element of at least one tactile sensor, wherein at least one information item about a tactile measurement point is produced;

b) transmitting the information item about the tactile measurement point to at least one control and evaluation unit;

c) controlling at least one microscope camera using the transmitted information item by the control and evaluation unit;

d) optically probing of the measurement object with the microscope camera which is at least partly arranged in the tactile probe element, wherein at least one illumination light beam is produced by at least one illumination device of the microscope camera, wherein the illumination light beam is focused in the probing point on the sensor surface of the tactile probe element by at least one microscope optical unit, wherein at least one magnified image of the measurement object is produced in an image plane by the microscope optical unit, and wherein the magnified image is recorded by at least one image capture device;

e) transmitting the magnified image to the control and evaluation unit; and f) evaluating the information item about the tactile measurement point and/or the magnified image with the control and evaluation unit and producing an information item about at least one coordinate of the measurement object by the control and evaluation unit.

With regard to exemplary embodiments and definitions, reference can be made to the above description of the probe system and of the coordinate measuring machine. The method steps can be carried out in the order indicated, wherein one or more of the steps can at least in part also be carried out simultaneously, and wherein one or more steps can be repeated multiple times. Furthermore, further steps can additionally be performed independently of whether or not they are mentioned in the present application.

A calibration of the probe system, in which the tactile sensor is calibrated, can be implemented in step a). By way of example, the calibration can be implemented prior to a tactile measurement in step a).

The measurement object can be probed in tactile fashion by known probing methods using the tactile sensor. The tactile measurement and also a reorientation can be undertaken using the calibrated probing element. The control and evaluation unit can be configured to carry out a tactile probing method.

The method may include a probing regulation of the optical probing. The produced, magnified image can be transmitted from the tactile sensor to the evaluation computer during the optical probing. The magnified image can be transmitted directly from the tactile sensor to the evaluation computer and/or the magnified image can be transmitted to electronics of the coordinate measuring machine and transmitted to the evaluation computer from there. In the electronics of the coordinate measuring machine, the image can be converted for CATS cabling and transmitted to the evaluation computer. The evaluation computer can be configured to evaluate the image and transmit a result of the evaluation to at least one control unit of the control and evaluation unit via at least one communications channel. At the evaluation computer, there can be conversion back to USB, for example USB 2.0, and an application can be fed with data via a driver of the microscope camera, said application undertaking the evaluation both for the probing regulation and for the pixel correction of the measurement result. A result for the probing regulation can be transmitted to the control unit via a TCP-IP transmission channel, said control unit undertaking a regulation of motors for ideal probing. The control unit can be configured to probe the measurement object optically, for example at an edge, in particular to track the measurement object by means of an unknown contour, as described in DE 10 111 130 A1, for example. The control and evaluation unit can be configured to distinguish between optical and tactile probing and/or to combine optical and tactile probing for applications.

The devices according to an aspect of the invention and the method according to an aspect of the invention are advantageous vis-à-vis known methods and devices. A number of possible workpieces and workpiece forms can be increased in a cost-effective manner by combining a tactile sensor and a microscope camera. By way of example, it is possible to measure color differences, for example texts, prints, marks, engravings, etc. Complicated focusing of the image is not necessary here since the focal plane lies on the sensor surface. Determining a position of very small bores and depressions, such as blisks, for example, which have bores in the 200 μm range, can be facilitated since the tactile measurement can be used to determine a position of a surface and, optically, a position of an edge. Further, the probe system, the coordinate measuring machine and the method can be used in further applications, such as determining a high point on blades, turbine blades, etc. Using the microscope camera, it is possible to exactly determine an edge of the blade and the latter can be tracked by a scanning process, while the tactile sensor is used to determine a height of the measurement object. By way of the one size of the optical measurement field, it is possible to determine the accuracy of the scanning path and also a possible speed. Other highly precise measurement objects, such as nozzles, too, which also contain tiny bores in addition to extremely strict tolerance dimensions, can be measured.

In summary, in the context of the present invention, the following exemplary embodiments are provided:

Exemplary Embodiment 1

Probe system for measuring at least one measurement object in optical and tactile fashion, comprising:
at least one tactile sensor, wherein the tactile sensor has at least one tactile probe element, wherein the tactile probe element has a sensor surface, wherein the tactile probe element is configured to probe the measurement object in tactile fashion at at least one probing point on the sensor surface;

at least one microscope camera, wherein the microscope camera has at least one illumination device which is configured to produce an illumination light beam, wherein the microscope camera has at least one microscope optical unit which is configured to focus the illumination light beam in the probing point and produce at least one magnified image of the measurement object in an image plane, wherein the microscope camera has at least one image capture device which is configured to record the magnified image, and wherein the microscope camera is at least partly arranged in the tactile probe element.

Exemplary Embodiment 2

Probe system according to the preceding exemplary embodiment, wherein the tactile probe element has at least one probing element.

Exemplary Embodiment 3

Probe system according to the preceding exemplary embodiment, wherein the probing element has at least one probe ball.

Exemplary Embodiment 4

Probe system according to the preceding exemplary embodiment, wherein the probe ball is configured as a hemisphere which has a mirrored plane face.

Exemplary Embodiment 5

Probe system according to either of the two preceding exemplary embodiments, wherein the probe ball is configured as a full ball, wherein the full ball is monolithic or composed from at least two parts.

Exemplary Embodiment 6

Probe system according to any one of the four preceding exemplary embodiments, wherein the probing element is made of an at least partly transparent material.

Exemplary Embodiment 7

Probe system according to the preceding exemplary embodiment, wherein the probing element has an industrial ruby ball or an industrial sapphire ball.

Exemplary Embodiment 8

Probe system according to any one of the six preceding exemplary embodiments, wherein the tactile probe element has at least one shaft, at which the probing element is arranged.

Exemplary Embodiment 9

Probe system according to the preceding exemplary embodiment, wherein the probing element is rotatable.

Exemplary Embodiment 10

Probe system according to either of the two preceding exemplary embodiments, wherein the face of the probing element directed towards the microscope camera is at least partly made plane such that no lens effect arises in a transition from shaft to probing element.

Exemplary Embodiment 11

Probe system according to any one of the three preceding exemplary embodiments, wherein the shaft has a tube that is mirrored on the inside.

Exemplary Embodiment 12

Probe system according to any one of the preceding exemplary embodiments, wherein the tactile sensor has at least one light guide.

Exemplary Embodiment 13

Probe system according to any one of the three preceding exemplary embodiments, wherein the probe system has at least one optical funnel.

Exemplary Embodiment 14

Probe system according to any one of the preceding exemplary embodiments, where-in the microscope optical unit has at least one optical element, wherein the optical element is selected from the group consisting of: a plurality of lenses, for example gradient index lenses (GRIN), and at least one lens system.

Exemplary Embodiment 15

Probe system according to any one of the preceding exemplary embodiments, wherein the illumination device includes at least one light source.

Exemplary Embodiment 16

Probe system according to the preceding exemplary embodiment, wherein at least one property of the illumination light beam is adjustable.

Exemplary Embodiment 17

Probe system according to any one of the preceding exemplary embodiments, where-in the microscope camera has at least one interface, in particular a USB interface.

Exemplary Embodiment 18

Probe system according to any one of the preceding exemplary embodiments, where-in the microscope optical unit has a magnification from 2× to 5000×, preferably from 10× to 1000×.

Exemplary Embodiment 19

Probe system according to any one of the preceding exemplary embodiments, where-in the image capture device has at least one CCD camera and/or at least one CMOS camera.

Exemplary Embodiment 20

Coordinate measuring machine for measuring at least one measurement object in optical and tactile fashion, comprising:

at least one probe system according to any one of the preceding embodiments relating to a probe system, at least one control and evaluation unit which is configured to control the probe system and to produce at least one information item about a measurement point at a surface of the measurement object.

Exemplary Embodiment 21

Method for measuring at least one measurement object in optical and tac-tile fashion by a coordinate measuring machine according to the preceding exemplary embodiment, wherein the method includes the following steps:
a) tactile probing of the measurement object at at least one probing point on at least one sensor surface with at least one tactile probe element of at least one tactile sensor, wherein at least one information item about a tactile measurement point is produced;
b) transmitting the information item about the tactile measurement point to at least one control and evaluation unit;
c) controlling at least one microscope camera using the transmitted information item by the control and evaluation unit;
d) optical probing of the measurement object with the microscope camera which is at least partly arranged in the tactile probe element, wherein at least one illumination light beam is produced by at least one illumination device of the microscope camera, wherein the illumination light beam is focused in the probing point on the sensor surface of the tactile probe element by at least one microscope optical unit, wherein at least one magnified image of the measurement object is produced in an image plane by the microscope optical unit, and wherein the magnified image is recorded by at least one image capture device;
e) transmitting the magnified image to the control and evaluation unit; and
f) evaluating the information item about the tactile measurement point and/or the magnified image with the control and evaluation unit and producing an information item about at least one coordinate of the measurement object with the control and evaluation unit.

Exemplary Embodiment 22

Method according to the preceding exemplary embodiment, wherein a calibration of the probe system is implemented in step a).

BRIEF DESCRIPTION OF THE DRAWINGS

The invention will now be described with reference to the drawings wherein:

FIGS. 1A to 1C show schematic illustrations of a probe system according to an exemplary embodiment of the invention;

DESCRIPTION OF EXEMPLARY EMBODIMENTS

Figure 2A:
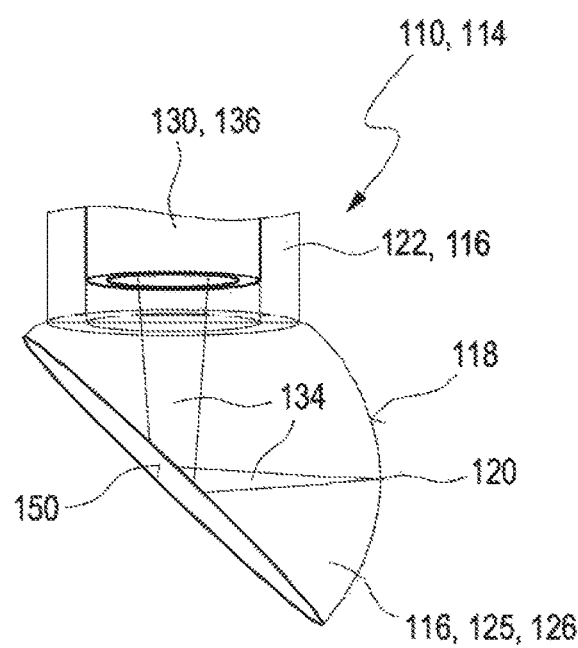
FIGS. 2A and 2B show schematic illustrations of a probe system according to further exemplary embodiments of the invention.
Figure 2B:
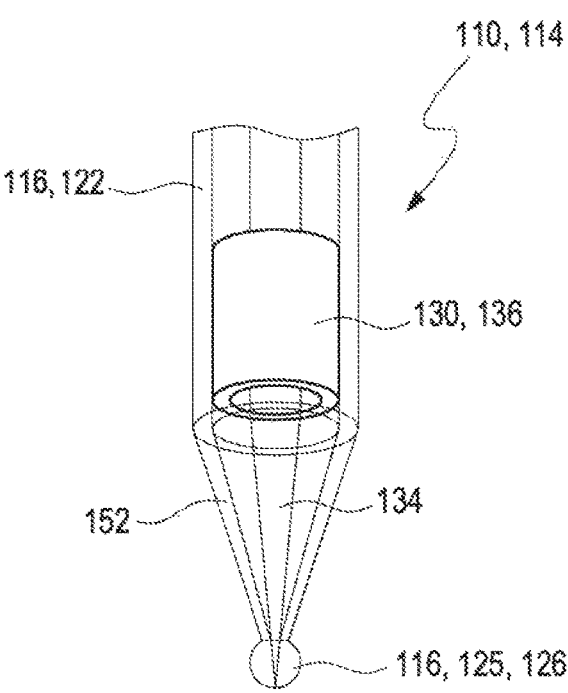

FIG. 1A shows a schematic illustration of a probe system 110 for measuring at least one measurement object 112 according to an exemplary embodiment of the invention, illustrated very schematically here, in optical and tactile fashion. The probe system 110 includes at least one tactile sensor 114. The tactile sensor 114 has at least one tactile probe element 116. The tactile probe element 116 has a sensor surface 118. The tactile probe element 116 is configured to probe the measurement object 112 in tactile fashion at at least one probing point 120 on the sensor surface 118.

The tactile sensor 114 can be configured as a probe. The tactile sensor 114 can have a shaft 122 for fastening the tactile probe element 116. The tactile sensor 114 can have an adapter for connecting the tactile sensor 114 to a further device, for example a coordinate measuring machine 124. By way of example, the tactile sensor 114 can be an inductively or capacitively measuring tactile sensor.

The tactile probe element 116 can have at least one probing element 125. The probing element 125 can have at least one probe ball 126. However, other forms are also conceivable.

The tactile sensor 114 can be configured to produce at least one signal, for example an electronic signal. The signal can be evaluated by at least one control and evaluation unit 128 and at least one information item about a measurement point at the surface of the measurement object 112 can be produced from the signal.

The shaft 122 can be a cylindrical shaft. The shaft 122 can be configured as a tube; in particular, the shaft can be hollow. The shaft 122 can have a length of less than 50 mm. A shaft length can be in the range of 20 to 240 mm. This range can also be undershot and/or exceeded for specific measurement tasks. The shaft 122 can extend substantially horizontally to a support on which the measurement object 112 is arranged, deviations from a horizontal alignment being possible within the scope of component tolerances.

The probe system 110 further includes at least one microscope camera 130. The microscope camera 130 has at least one illumination device 132, which is configured to produce an illumination light beam 134. The microscope camera 130 has at least one microscope optical unit 136, which is configured to focus the illumination light beam 134 in the probing point 120 and to produce at least one magnified image of the measurement object 112 in at least one image plane. The microscope camera 130 has at least one image capture device 138, which is configured to record the magnified image. The microscope camera 130 is at least partly arranged in the tactile probe element 116. The tactile sensor 114 has at least one tactile probe element 116. The tactile probe element 116 may have the at least one shaft 122 and the at least one probing element 125, e.g., a probe ball 126. The microscope optical unit 136 may, for example, be arranged in the shaft 122 of the tactile probe element 116, such that the microscope camera 130 is at least partly arranged in the tactile probe element 116.

The microscope optical unit 136 can have a plurality of optical components. In this case, the components can be configured in a manner spatially separated from one another. By way of example, the microscope optical unit 136 can include a plurality of optical components, for example one or more objectives, stops and/or further optical components. The microscope optical unit 136 can have at least one optical element. The optical element can be selected from the group consisting of: a plurality of lenses, for example gradient index lenses (GRIN), at least one lens system, at least one mirror; at least one mirror system. The microscope optical unit 136 can have a magnification from 2× to 5000×, typically from 10× to 1000×. The microscope optical unit 136 can have an optical axis, for example a common optical axis of the optical elements.

The microscope optical unit 136 can transmit some of the energy emanating from the measurement object 112 in the visible spectral range into the at least one image plane. By way of example, the energy can be produced by illuminating the measurement object 112 and can be converted at the measurement object 112 into transferable energy, for example by reflection. The image capture device 138 can have a plurality of pixels. The image capture device 138 can have at least one CCD camera and/or at least one CMOS camera. By way of example, the image capture device 138 can have at least one CCD chip, for example with a resolution of 1280×720 pixels.

The microscope camera 130 can be connectable to at least one further device, for example to the control and evaluation unit 128. To this end, the microscope camera 130 can have at least one interface 140. In particular, the microscope camera 130 can have at least one inter-face. The microscope camera 130 can have a universal interface, for example at least one USB interface, for example a USB 2.0 or USB 3.0 interface. As an alternative or in addition thereto, the microscope camera can have at least one radio interface. By way of example, the microscope camera 130 can have at least one USB camera.

The illumination device 132 can have at least one light source 142. By way of example, the illumination device 132 can have a plurality of identical or differently configured light sources 142. By way of example, the illumination device 132 can have at least one light-emitting diode (LED). The illumination device 132 can have a plurality of LEDs, for example 2, 3, 6 or more LEDs. At least one property of the illumination light beam 134 can be adjustable. By way of example, the illumination device 132 can be configured to dim the illumination light beam 134.

The microscope camera 130 is at least partly arranged in the tactile probe element 116. By way of example, the microscope optical unit 136 can be arranged in the shaft 122. The image capture device 138 and/or the illumination device 132 can be arranged at least partly outside of the tactile probe element 116, e.g., in a further component of the tactile sensor 114 and/or in a suspension 144, in particular a stylus receptacle, for the tactile probe element 116. The suspension 144 can include at least one adapter plate and/or at least one fastening sleeve for receiving the shaft 122. The microscope camera 130 can be at least partly integrated in the tactile probe element 116. By way of example, the microscope camera 130 can be at least partly arranged in the shaft 122. By way of example, the microscope optical unit 136 can be at least partly arranged in the shaft 122 and/or the image capture device 138 can be at least partly arranged in the shaft 122.

The microscope optical unit 136 can have at least one GRIN lens, in particular a GRIN rod lens and/or a system of GRIN lenses. In particular, the tactile probe element 116 can be configured as a thin stylus in this exemplary embodiment.

The microscope optical unit 136 is configured to focus the illumination light beam 134 in the probing point 120; see FIG. 1C. In particular, the illumination light beam 134 can be focused in a point or region on the sensor surface 118 of the tactile sensor 114. The microscope optical unit 136 can be arranged in the tactile probe element 116 in such a way that a focal spot of the microscope optical unit 136 lies on the sensor surface 118.

The probing element 125 can be composed of an at least partly transparent material. The probing element 125 can have transmissive properties. The tactile probe element 116 can be at least partly transparent to the illumination light beam 134 and/or a light beam produced by the measurement object 112. The probing element 125 can include $Al_2O_3$, for example 99.99% $Al_2O_3$. The probing element 125 can have a dye, for example a red dye ($CrO_3$). The probing element 125 can have an industrial ruby ball. The probing element 125 can have an industrial sapphire ball, which has no dye.

The face of the probing element 125 directed towards the microscope camera 130, in particular the probe ball 124, can be at least partly made plane such that no lens effect arises in a transition 146 from shaft 122 to probing element 125. The probing element 125 and a fastening position of the probing element 125 can be such that a focal plane of the micro-scope optical unit 136 arises at the sensor surface 118 such that the image produced by the image capture device 138 is automatically in focus as soon as the measurement object 112 is probed by the tactile sensor 114. Tactile probing can be combined with the optical probing such that, in addition to the accurate optical measurement, for example of XY, it is also possible to evaluate the normally impossible probing in Z, which is highly precise as a result of the tactile method. A curvature of the sensor surface 118 of the probe ball 124 can be neglected since an image field of the microscope camera 130 can be small and a very much smaller "field of view" of the small image field can be evaluated exactly in the center.

The probe system can have a reflected light illumination device. The reflected light illumination device can be part of the illumination device. The reflected light illumination device can be configured to illuminate the measurement object 112 through the probing element 125. As a result, a reduction in the size of the probing element 125 may be possible in the case of appropriate shaping of the microscope camera 130. A combination of an optical and tactile measurement in a manual mode can be particularly advantageous since no focusing aids and no overview camera, either, are necessary. The tactile probe element 116 itself can at least approximately indicate a probing position. Measuring and/or imaging the measurement object 112 can easily be effected by the optical measurement since the image of the microscope camera 130 is already in focus and magnified.

The illumination device 132 and/or the reflected light illumination device and/or the image capture device 138 can be arranged in the suspension 144, in particular in the stylus receptacle. Such a configuration allows a reduction in the size of the tactile probe element 116. The tactile sensor 114 can have at least one light guide 148. The shaft 122 may be produced from a transparent ceramic, for example glass, and may be configured to guide the illumination light beam 134 to the probing element 125. The shaft 122 can act as a light guide 148. The shaft 122 may have a tube that is mirrored on the inside. This can prevent bothersome radiation being incident on the image capture device 138 arranged in the stylus receptacle. Further, such a configuration can be advantageous since heat arising as a result of the illumination device 134 arises at a non-critical point and not in the vicinity of the probing element 125.

FIG. 2A shows an exemplary embodiment, in which the probe ball 126 is configured as a hemisphere which has a mirrored plane face 150. By way of example, the probe ball 126 can be divided at any angle and the plane face 150 can be mirrored. Such a configuration facilitates the ability to measure even within bores. The plane face 150 can be configured to deflect the illumination light beam 134 by the mirroring. By way of example, the probe ball 126 can be divided centrally at an angle of 45° and the arising plane face 150 can be mirrored such that there is a deflection through an angle of 90°. However, other divisions at other angles and, consequently, other deflection angles are also conceivable. The probing element 125 can be rotatable; in particular, the shaft 122 and/or the probing element 125 can be mounted rotatably about a rotation axis. In combination with a rotatable mount, optically identifiable features in bores can be identifiable at otherwise poorly accessible points and can be measured exactly.

The probe system 110 can have at least one optical funnel 152. The optical funnel 152 can be configured to guide the illumination light beam 134 to the probing element 125. The optical funnel 152 can be arranged between the shaft 122 and the probe ball 126. The optical funnel 152 can have a greater opening width on a side of the optical funnel 152 facing the illumination device 132 than on a side of the optical funnel 152 facing the probe ball 126. This may render a reduction in the probing element size possible.

Figure 3:
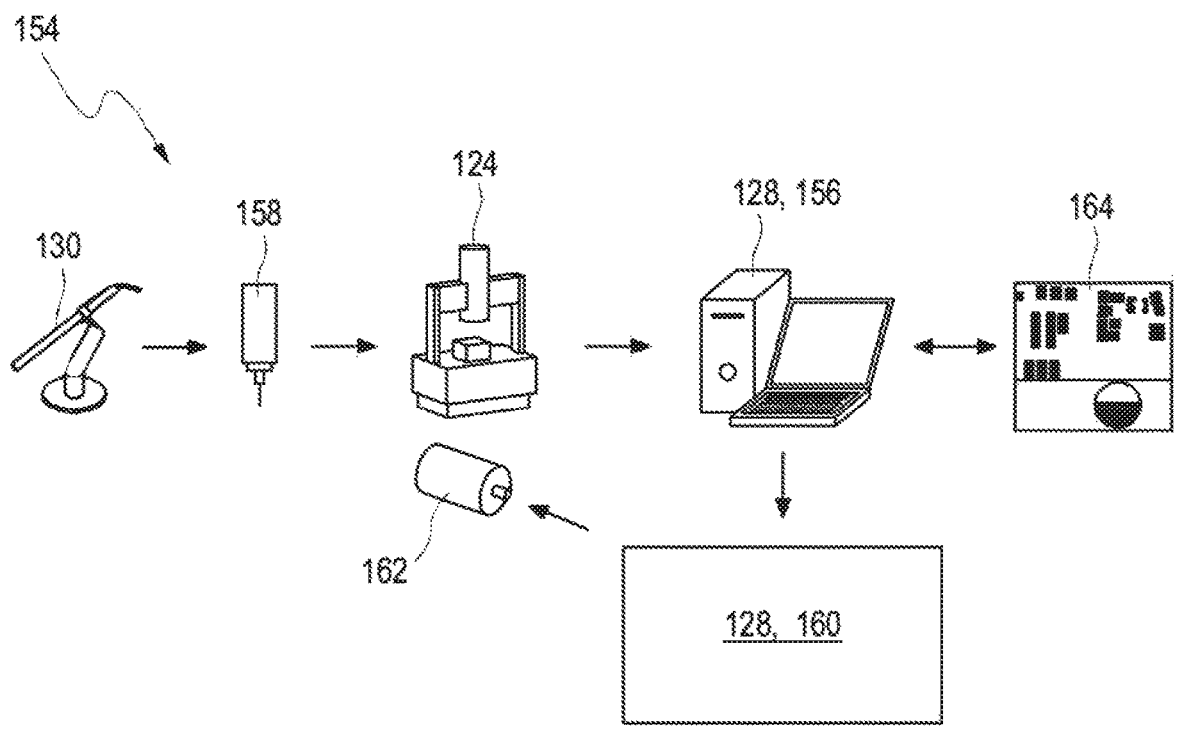
FIG. 3 shows a schematic illustration of an exemplary embodiment of an optical probing.

Tactile probing can be implemented by the known methods, wherein the measurement and also a reorientation can be implemented with the calibrated probe ball 126. FIG. 3 shows a schematic illustration of an exemplary embodiment of optical probing 154. During the optical probing 154, the produced, magnified image can be transmitted from the microscope camera 130 to an evaluation computer 156, for example by at least one communications channel. The magnified image of the microscope camera 130 can be transmitted to the evaluation computer via an adapter plate, also referred to as probe head plate, at which the probe system 110 is arranged, a probe head 158 and the coordinate measuring machine 124. The magnified image can be transmitted directly from the microscope camera 130 to the evaluation computer 156 and/or the magnified image can be transmitted to electronics of the coordinate measuring machine 124 and transmitted to the evaluation computer from there. In the electronics, the image can be converted for CATS cabling and transmitted to the evaluation computer 156. The evaluation computer 156 can be configured to evaluate the image and transmit a result of the evaluation to at least one control unit of the control and evaluation unit via at least one communications channel. At the evaluation computer 156, there can be conversion back to USB, for example USB 2.0, and an application can be fed with data via a driver of the microscope camera 130, said application undertaking the evaluation both for a probing regulation and for a pixel correction of the measurement result. A result for the probing regulation can be transmitted to a control unit 160 via a TCP-IP transmission channel, said control unit undertaking a regulation of motors 162 for ideal probing. The control unit 160 can be configured to probe the measurement object 112 optically, for example at an edge, in particular to track the measurement object by an unknown contour, as described in DE 10 111 130 A1, for example. The control and evaluation unit 128 can be configured to distinguish between optical and tactile probing and/or to combine optical and tactile probing for applications.

By way of example, the measurement object 112, as shown in FIG. 3, can be a so-called USAF normal 164. The following table shows experimental results, in the case of both manual and CNC (computer numerical control) processes:

| Measurement number | Machine position [mm] | | | Probe head position [mm] | | | Sensor/probe ball position [mm] (Sum of machine and probe head) | | | Mean value | Distance |
|---|---|---|---|---|---|---|---|---|---|---|---|
| | X | Y | Z | x | y | z | X | Y | Z | Y | Y |
| 1 | 0.0005 | 0.0714 | 0.0012 | −0.0275 | −0.0199 | 0.0339 | −0.0270 | 0.0515 | 0.0351 | | |
| 1 | 0.0004 | 0.0811 | 0.0006 | −0.0275 | −0.0206 | 0.0348 | −0.0271 | 0.0605 | 0.0354 | 0.0552 | |
| 1 | 0.0007 | 0.0740 | 0.0012 | −0.0280 | −0.0204 | 0.0341 | −0.0273 | 0.0536 | 0.0353 | | |
| 1 | 0.0006 | 0.0094 | 0.0007 | −0.0276 | −0.0201 | 0.0345 | −0.0270 | −0.0107 | 0.0352 | | 0.0645 |
| 1 | −0.0001 | 0.0139 | 0.0005 | −0.0273 | −0.0203 | 0.0325 | −0.0274 | −0.0064 | 0.0330 | −0.0093 | |
| 1 | 0.0003 | 0.0083 | 0.0009 | −0.0272 | −0.0192 | 0.0318 | −0.0269 | −0.0109 | 0.0327 | | |
| 2 | 0.0004 | 0.0778 | 0.0011 | −0.0275 | −0.0199 | 0.0339 | −0.0271 | 0.0579 | 0.0350 | | |
| 2 | 0.0001 | 0.0832 | 0.0011 | −0.0275 | −0.0206 | 0.0348 | −0.0274 | 0.0626 | 0.0359 | 0.0601 | |
| 2 | 0.0003 | 0.0803 | −0.0003 | −0.0280 | −0.0204 | 0.0341 | −0.0277 | 0.0599 | 0.0338 | | |
| 2 | −0.0001 | 0.0127 | 0.0001 | −0.0276 | −0.0201 | 0.0345 | −0.0277 | −0.0074 | 0.0346 | | 0.0692 |
| 2 | 0.0002 | 0.0081 | 0.0003 | −0.0273 | −0.0203 | 0.0325 | −0.0271 | −0.0122 | 0.0328 | −0.0091 | |
| 2 | 0.0004 | 0.0115 | −0.0001 | −0.0272 | −0.0192 | 0.0318 | −0.0268 | −0.0077 | 0.0317 | | |

An element of the USAF normal with a line width of 70 μm was selected and a width of the line was determined by threefold optical probing of the line from both sides. Here, use is made of measurement fields with a radius of 3 and 7 pixels. For the trial setup, use is made of a microscope camera 130 with a pixel resolution of approximately 5 μm, a magnification from 10× to 200×, an external diameter of approximately 8 mm and an illumination with 6 LEDs. To provide evidence of the accuracy, probing was carried out respectively 3 times on one side of a 70 μm wide line on the normal and the mean value was calculated therefrom. The probing direction was +Y and —Y in this case. The averaged values were subtracted from one another, as a result of which a result of 64.5 μm and 69.2 μm was achieved. Without any correction, a probing regulation repeatability in the region of 5 μm was achieved and the width of the line with 70 μm was established with the uncertainty of the single-point measurement. This high accuracy for optical measurements can be achieved because it is not the camera itself but the coordinate measuring machine that represents a material measure and the accuracy of the camera becomes irrelevant as a result of always equal central probing.

It is understood that the foregoing description is that of the exemplary embodiments of the invention and that various changes and modifications may be made thereto without departing from the spirit and scope of the invention as defined in the appended claims.

LIST OF REFERENCE NUMERALS

110 Probe system
112 Measurement object

114 Tactile sensor
116 Tactile probe element
118 Sensor surface
120 Probing point
122 Shaft
124 Coordinate measuring machine
125 Probing element
126 Probe ball
128 Control and evaluation unit
130 Microscope camera
132 Illumination device
134 Illumination light beam
136 Microscope optical unit
138 Image capture device
140 Interface
142 Light source
144 Suspension
146 Transition
148 Light guide
150 Plane face
152 Optical funnel
154 Optical probing
156 Evaluation computer
158 Probe head
160 Control unit
162 Motors
164 USFA normal
110 Probe system
112 Measurement object
114 Tactile sensor
116 Tactile probe element
118 Sensor surface
120 Probing point
122 Shaft
124 Coordinate measuring machine
125 Probing element
126 Probe ball
128 Control and evaluation unit

What is claimed is:

1. A probe system for measuring at least one measurement object in an optical and tactile fashion, the probe system comprising:
    at least one tactile sensor, wherein the at least one tactile sensor includes at least one tactile probe element, wherein the at least one tactile probe element has a sensor surface, wherein the at least one tactile probe element is configured to probe the at least one measurement object in tactile fashion at at least one probing point on the sensor surface;
    at least one microscope camera, wherein the at least one microscope camera has at least one illumination device configured to produce an illumination light beam, wherein the at least one microscope camera includes at least one microscope optical unit configured to focus the illumination light beam in the at least one probing point and to produce at least one magnified image of the at least one measurement object in an image plane, wherein the at least one microscope camera includes at least one image capture device configured to record a magnified image, and wherein the at least one microscope camera is at least partly arranged in the at least one tactile probe element.

2. The probe system according to claim 1, wherein the at least one tactile probe element includes at least one probing element, and wherein the at least one probing element includes at least one probe ball.

3. The probe system according to claim 2, wherein the at least one probe ball is configured as a hemisphere which has a mirrored plane face.

4. The probe system according to claim 2, wherein the at least one probing element is made of an at least partly transparent material, and wherein the at least one probing element includes an industrial ruby ball or an industrial sapphire ball.

5. The probe system according to claim 3, wherein the at least one probing element is made of an at least partly transparent material, and wherein the at least one probing element includes an industrial ruby ball or an industrial sapphire ball.

6. The probe system according to claim 2, wherein the at least one tactile probe element includes at least one shaft at which the at least one probing element is arranged, wherein a face of the at least one probing element directed towards the at least one microscope camera has at least in part a plane shape that prevents a lens effect to arise in a transition from the at least one shaft to the at least one probing element.

7. The probe system according to claim 3, wherein the at least one tactile probe element includes at least one shaft at which the at least one probing element is arranged, wherein a face of the at least one probing element directed towards the at least one microscope camera has at least in part a plane shape that prevents a lens effect to arise in a transition from the at least one shaft to the at least one probing element.

8. The probe system according to claim 4, wherein the at least one tactile probe element includes at least one shaft at which the at least one probing element is arranged, wherein a face of the at least one probing element directed towards the at least one microscope camera has at least in part a plane shape that prevents a lens effect to arise in a transition from the at least one shaft to the at least one probing element.

9. The probe system according to claim 1, wherein the at least one tactile sensor includes at least one light guide.

10. The probe system according to claim 4, further including at least one optical funnel.

11. The probe system according to claim 6, further including at least one optical funnel.

12. The probe system according to claim 9, further including at least one optical funnel.

13. The probe system according to claim 1, wherein the at least one microscope camera includes at least one interface.

14. The probe system according to claim 13, wherein the at least one interface is a Universal Serial Bus (USB) interface.

15. The probe system according to claim 1, wherein the at least one image capture device includes at least one of a charge-coupled device (CCD) camera and a complementary metal-oxide-semiconductor (CMOS) camera.

16. A coordinate measuring machine for measuring the at least one measurement object in the optical and tactile fashion, the coordinate measuring machine comprising:
    the probe system according to claim 1,
    at least one control and evaluation unit configured to control the probe system and to produce at least one information item about a tactile measurement point at a surface of the at least one measurement object.

17. A method for measuring the at least one measurement object in the optical and tactile fashion by a coordinate measuring machine according to claim 16, the method comprising:
    a) tactile probing the at least one measurement object at the at least one probing point on at least one sensor surface with the at least one tactile probe element of the at least one tactile sensor and producing the at least one information item about the tactile measurement point, wherein the at least one information item about the tactile measurement point is at least one first information item;

b) transmitting the at least one first information item about the tactile measurement point to the at least one control and evaluation unit;

c) controlling the at least one microscope camera based on the at least one first information item by the at least one control and evaluation unit;

d) optically probing of the at least one measurement object with the at least one microscope camera at least partly arranged in the at least one tactile probe element, wherein the illumination light beam is produced by the at least one illumination device of the at least one microscope camera, wherein the illumination light beam is focused in the at least one probing point on the at least one sensor surface of the at least one tactile probe element by the at least one microscope optical unit, wherein the at least one magnified image of the at least one measurement object is produced in the image plane by the at least one microscope optical unit, wherein the magnified image is recorded by the at least one image capture device;

e) transmitting the magnified image to the at least one control and evaluation unit; and f) evaluating the at least one first information item about at least one of the tactile measurement point and the magnified image with the control and evaluation unit and producing a second information item about at least one coordinate of the at least one measurement object by the control and evaluation unit.

18. The method according to claim 17, wherein a calibration of the probe system is implemented in step a).

* * * * *